Aug. 24, 1926.

J. TURNER 1,597,123

GROUND LEVELER FOR TRACTORS

Filed Nov. 4, 1924

INVENTOR
James Turner
BY John A. Naismith
ATTORNEY

Patented Aug. 24, 1926.

1,597,123

UNITED STATES PATENT OFFICE.

JAMES TURNER, OF CAMPBELL, CALIFORNIA.

GROUND LEVELER FOR TRACTORS.

Application filed November 4, 1924. Serial No. 747,855.

In operating the track layer type of tractor over uneven ground, especially over ridged land when cultivating the same subsequent to irrigation, when the forward end of the tractor rides up on a ridge or hummock the whole tractor necessarily ascends to the ridge of the elevation until it overbalances thereon and plunges down on the opposite side nose first.

Continued repetition of this action not only subjects the tractor to excessive racking stresses and strains, but adds greatly to the discomfort and labor of operating the tractor.

It is one object of the present invention to provide an attachment for a tractor of the type indicated that will level the ground in front of both tracks thereof as the machine advances.

It is another object of the invention to provide a device of the character indicated that automatically adjusts itself to the normal level of the ground operated over and that, therefore, will not dig into the ground upon any forward lurching movement of the machine.

It is still a further object to provide a device that will be simple in construction, economical to manufacture, and highly efficient in its practical application, and particularly adapted for use on a Cletrac tractor.

Figure 2:
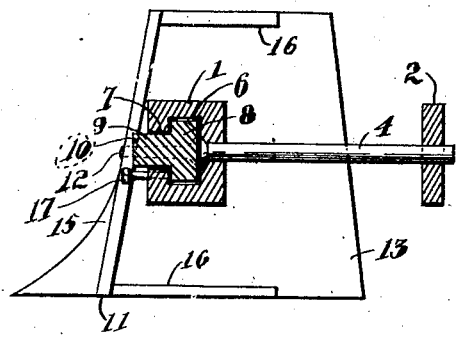
Figure 2 is a section on line 2—2 Figure 1.
Figure 1:
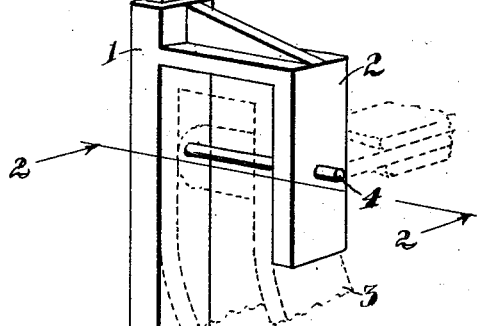
Figure 1 is a perspective view of the device.
Figure 1:
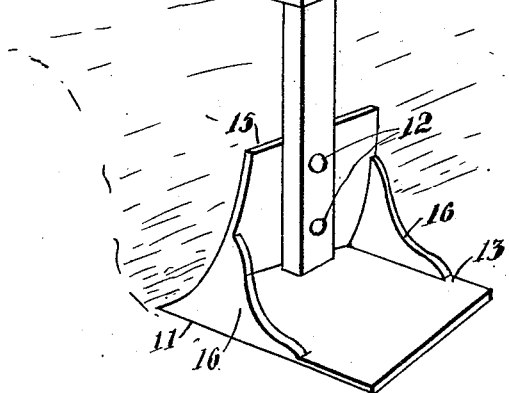

Referring more particularly to the drawing, 1 indicates a substantially inverted U-shaped casting, one portion of which forms a hook 2 adapted in the present case, to hook over the forward end of the frame 3 of a "Cletrac" tractor. When in position it is secured by a bolt 4, this bolt 4 replacing the one already provided for carrying spring 5 in order to secure the necessary length. The forward portion of casting 1 forms a channel 6 and groove 7, and when mounted on frame 3 as described is rigidly held at right angles to the normal plane of the surface over which the tractor moves.

The channel 6 and groove 7 together form a guide for a bar 8 having a T shaped cross-section as shown, the web 9 extending through groove 7 and being bevelled somewhat at its lower end as indicated by the dotted line at 10, this bevelled portion having shoe 11 mounted thereon by means of bolts 12. By so spacing the shoe 11 from the main portion of the bar the bar is permitted to slide freely up and down in the guide 6—7 throughout its full length from the base portion 13 of shoe 11 to the pin 14 set in the upper end of the bar.

The face portion 15 of shoe 11 is braced against the base 13 by side parts 16, the base part 13 preferably lying in a plane at right angles to bar 8.

Assuming one of the devices to be properly mounted upon the forward end of each of the side frame members of a Cletrac tractor as described, their action is as follows.

As the tractor moves forwardly over substantially level ground the shoes 11 perform no work, simply sliding along on their base portions 13. If, for instance, the tractor rides into a soft place and noses down a little the shoes 11 do not dig into the ground, the bar 8 simply slides upwardly in guide 6—7. When, however, the tractor moves into a body of raised earth such as a cross ridge formed for irrigating purposes, then the shoe passes through it in advance of the tractor and throws the earth to one side, thereby forming open passages through the ridge for the tractor to travel in.

It may be readily seen from the foregoing that I have provided a device that consists of but few parts and simple parts; it is strong, durable, and economical to manufacture; it is quickly and easily assembled and installed on a tractor frame.

When the tractor is in use on smooth ground and the device is not desired, it is only necessary to raise the bar in its guide and secure it in such raised position by tightening up set screw 17. Particular attention is called to the shoe 11 and the manner in which it is formed to insure its smooth operation on the surface of the ground. The base 13 is broad and flat and will not permit the shoe to dig into the ground even though the tractor is working on very loose soil. Upon a downward movement of the forward end of the tractor frame 3 the shoe rests solidly on the ground without other pressure than its own weight and continues to slide forward on the general ground level as the tractor advances.

It is to be understood, of course, that while I have herein shown and described one specific embodiment of the invention, changes in form, construction and method of application and operation may be made within the scope of the appended claim.

I claim:—

A track preparing attachment for tractors, and the like, comprising a substantially vertically disposed guide, a ground-leveling shoe, and a support for the shoe slidable in the guide and having a forwardly extending web to which the shoe is attached for spacing the latter forwardly of the guide-embracing portion of the support.

JAMES TURNER.